[12] United States Patent
Muto et al.

(10) Patent No.: US 10,053,647 B2
(45) Date of Patent: Aug. 21, 2018

(54) WORKING FLUID COMPOSITION FOR REFRIGERATOR, AND REFRIGERATOR OIL

(71) Applicants: DENSO CORPORATION, Kariya-shi, Aichi (JP); KABUSHIKI KAISHA TOYOTA JIDOSHOKKI, Kariya-shi, Aichi (JP); JX NIPPON OIL & ENERGY CORPORATION, Chiyoda-ku, Tokyo (JP)

(72) Inventors: Masataka Muto, Obu (JP); Hajime Mukawa, Nagoya (JP); Takekazu Kano, Obu (JP); Genki Hayashi, Kariya (JP); Kazuki Yamamoto, Kariya (JP); Takahiro Hoshida, Kariya (JP); Hitoshi Takahashi, Tokyo (JP); Ken Sawada, Tokyo (JP); Akira Tada, Tokyo (JP); Souichirou Konno, Tokyo (JP)

(73) Assignees: Denso Corporation, Kariya-shi (JP); Kabushki Kaisha Toyota Jidoshokki, Kariya-shi (JP); JX Nippon Oil & Energy Corporation, Tokyo (JP)

( * ) Notice: Subject to any disclaimer, the term of this patent is extended or adjusted under 35 U.S.C. 154(b) by 11 days.

(21) Appl. No.: 15/106,532

(22) PCT Filed: Dec. 22, 2014

(86) PCT No.: PCT/JP2014/083962
§ 371 (c)(1),
(2) Date: Jun. 20, 2016

(87) PCT Pub. No.: WO2015/098869
PCT Pub. Date: Jul. 2, 2015

(65) Prior Publication Data
US 2017/0037337 A1 Feb. 9, 2017

(30) Foreign Application Priority Data

Dec. 25, 2013 (JP) ................................. 2013-267083

(51) Int. Cl.
*C09K 5/04* (2006.01)
*C10M 171/00* (2006.01)
(Continued)

(52) U.S. Cl.
CPC ......... *C10M 171/008* (2013.01); *C09K 5/045* (2013.01); *C10M 105/38* (2013.01); *C10M 129/18* (2013.01); *C10M 137/04* (2013.01); *C10M 137/10* (2013.01); *C10M 169/04* (2013.01); *C09K 2205/126* (2013.01); *C09K 2205/24* (2013.01); *C10M 2207/026* (2013.01); *C10M 2207/042* (2013.01); *C10M 2207/24* (2013.01); *C10M 2207/283* (2013.01); *C10M 2207/2835* (2013.01); *C10M 2223/04* (2013.01); *C10M 2223/041* (2013.01); *C10M 2223/047* (2013.01); *C10N 2220/028* (2013.01); *C10N 2220/302* (2013.01); *C10N 2230/06* (2013.01); *C10N 2230/70* (2013.01); *C10N 2240/30* (2013.01)

(58) Field of Classification Search
CPC .............. C09K 5/045; C09K 2205/126; C09K 2205/24; C10M 137/04; C10M 137/10; C10M 169/04; C10M 105/38; C10M 129/18; C10M 171/008; C10M 2223/047; C10M 2223/04; C10M 2207/042; C10M 2207/026; C10M 2207/24; C10M 2207/28; C10N 2230/06; C10N 2240/30
USPC ....................................................... 252/68, 69
See application file for complete search history.

(56) References Cited

U.S. PATENT DOCUMENTS 8,703,662 B2 * 4/2014 Kaneko .................... F04B 39/02
252/68
9,234,155 B2 * 1/2016 Saito ....................... C09K 5/045
9,546,334 B2 * 1/2017 Kishi ..................... C10M 105/38
(Continued)

FOREIGN PATENT DOCUMENTS

CN 1232865 A 10/1999
CN 1930276 A 3/2007
(Continued)

OTHER PUBLICATIONS

International Preliminary Report on Patentability dated Jul. 7, 2016 in International Patent Application No. PCT/JP2014/083962.

*Primary Examiner* — Douglas J McGinty
(74) *Attorney, Agent, or Firm* — Hunton Andrews Kurth LLP

(57) ABSTRACT

The present invention provides a working fluid composition for a refrigerating machine, comprising a refrigerating machine oil that comprises an ester of a polyhydric alcohol and a fatty acid, an epoxy compound, and a phosphorus compound, and a fluoropropene refrigerant, wherein the polyhydric alcohol constituting the ester comprises pentaerythritol and dipentaerythritol, the fatty acid constituting the ester comprises at least one selected from fatty acids having 4 to 9 carbon atoms, and the epoxy compound and the phosphorus compound satisfy a condition represented by the following formula (1).

[Formula 1]

$$0.10 \leq \frac{\left(\frac{N_E}{M_E} \cdot W_E\right)}{\left(\frac{N_P}{M_P} \cdot W_P\right)} \leq 1.50 \quad (1)$$

12 Claims, 1 Drawing Sheet

(51) Int. Cl.
*C10M 137/04* (2006.01)
*C10M 137/10* (2006.01)
*C10M 169/04* (2006.01)
*C10M 105/38* (2006.01)
*C10M 129/18* (2006.01)

(56) References Cited

U.S. PATENT DOCUMENTS

| | | | | |
|---|---|---|---|---|
| 2010/0038582 | A1* | 2/2010 | Shimomura | C09K 5/044 252/67 |
| 2010/0051854 | A1* | 3/2010 | Sawada | C10M 105/38 252/68 |
| 2010/0133463 | A1 | 6/2010 | Kaneko et al. | |
| 2010/0147016 | A1* | 6/2010 | Kaneko | F04B 39/02 62/468 |
| 2012/0322706 | A1 | 12/2012 | Matsumoto et al. | |
| 2013/0207024 | A1 | 8/2013 | Takigawa et al. | |
| 2014/0128302 | A1* | 5/2014 | Matsumoto | C09K 5/045 508/465 |
| 2014/0135241 | A1* | 5/2014 | Matsumoto | C09K 5/045 508/304 |
| 2014/0374647 | A1* | 12/2014 | Saito | C09K 5/042 252/68 |
| 2015/0028252 | A1* | 1/2015 | Saito | C09K 5/045 252/68 |
| 2018/0044608 | A1* | 2/2018 | Kaneko | C10M 169/04 |
| 2018/0079982 | A1* | 3/2018 | Kaneko | C10M 105/38 |

FOREIGN PATENT DOCUMENTS

| | | | |
|---|---|---|---|
| CN | 103097501 A | 5/2013 | |
| JP | 2001226690 A | 8/2001 | |
| JP | 2005248038 A | 9/2005 | |
| JP | 2008266423 A | 11/2008 | |
| JP | 2013014672 A | 1/2013 | |
| JP | 2013014673 A | 1/2013 | |
| JP | WO 2013187084 A1 * | 12/2013 | ............. C09K 5/045 |
| WO | 2008/130026 A1 | 10/2008 | |
| WO | 2013/187084 A1 | 12/2013 | |

\* cited by examiner

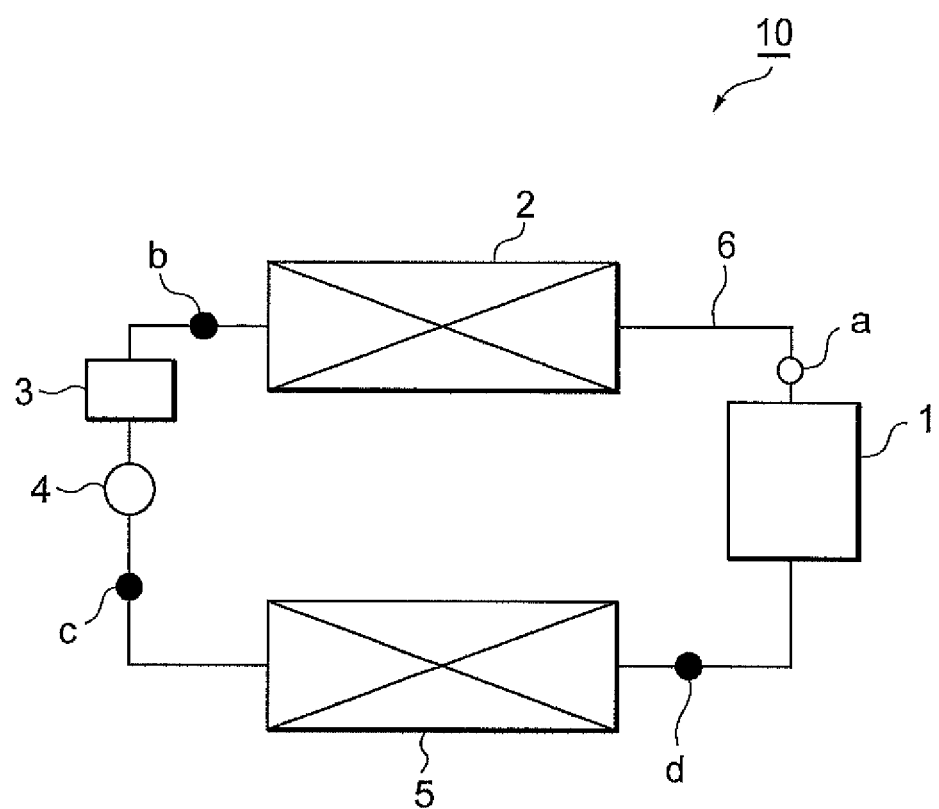

WORKING FLUID COMPOSITION FOR REFRIGERATOR, AND REFRIGERATOR OIL

CROSS-REFERENCE TO RELATED APPLICATIONS

This is a national phase application based on the PCT International Patent Application No. PCT/JP2014/083962 filed Dec. 22, 2014, claiming priority to Japanese Patent Application No. 2013-267083 filed Dec. 25, 2013, the entire contents of both of which are incorporated herein by reference.

TECHNICAL FIELD

The present invention relates to a working fluid composition for a refrigerating machine and to a refrigerating machine oil.

BACKGROUND ART

CFC (chlorofluorocarbons) and HCFC (hydrochloro-fluorocarbons), which have conventionally been used as refrigerants for refrigerating apparatuses, have been subjected to regulation due to the problem of recent ozone layer depletion, and HFC (hydrofluorocarbons) have come to be used as refrigerants instead of CFC and HCFC.

Among HFC refrigerants, HFC-134a, which has normally been used as a refrigerant for automotive air conditioners, has an ozone depleting potential (ODP) of 0 but has a high global warming potential (GWP), and therefore has been subjected to regulation in Europe. Thus, the development of a refrigerant that replaces HFC-134a is an urgent need.

Under such a background, use of unsaturated fluorohydrocarbon refrigerants whose ODP and GWP are extremely small and whose thermodynamic properties, which are a measure of refrigerant performance, are equal to or higher than HFC-134a has been proposed as refrigerants that replace HFC-134a.

Moreover, in Patent Literature 1, for example, a refrigerating machine oil composition comprising: a base oil that comprises a polyol ester-based compound as a main component; a phosphorus-based additive consisting of a phosphoric acid triester and/or a phosphorous acid triester; and at least one acid scavenger selected from glycidyl esters, glycidyl ethers, and α-olefin oxides is disclosed as a refrigerating machine oil that can be used together with an unsaturated fluorohydrocarbon refrigerant and that can improve performances such as compatibility with unsaturated fluorohydrocarbon refrigerants, sealing properties, friction properties at sliding portions, and stability.

CITATION LIST

Patent Literature

Patent Literature 1: Japanese Unexamined Patent Publication No. 2008-266423

SUMMARY OF INVENTION

Technical Problem

However, according to studies conducted by the present inventors, even the refrigerating machine oil composition disclosed in Patent Literature 1 still has room for improvement in terms of achieving both lubricity and stability. Especially in the case of the refrigerating machine oil composition, the friction property can be improved to some extent; however, the antiwear property is liable to be insufficient.

The present invention has been accomplished in consideration of such circumstances and intends to provide a working fluid composition for a refrigerating machine and a refrigerating machine oil, which make it possible to achieve both the antiwear property and the stability.

Solution to Problem

In order to solve the problem, the present invention provides a working fluid composition for a refrigerating machine, comprising: a refrigerating machine oil comprising an ester of a polyhydric alcohol and a fatty acid, an epoxy compound, and a phosphorus compound; and a fluoropropene refrigerant, wherein the polyhydric alcohol constituting the ester comprises pentaerythritol and dipentaerythritol, the fatty acid constituting the ester comprises at least one selected from fatty acids having 4 to 9 carbon atoms, and the epoxy compound and the phosphorus compound satisfy a condition represented by the following formula (1):

[Formula 1]

$$0.10 \leq \frac{\left(\frac{N_E}{M_E} \cdot W_E\right)}{\left(\frac{N_P}{M_P} \cdot W_P\right)} \leq 1.50 \quad (1)$$

wherein $N_E$ represents the number of epoxy groups per one molecule of the epoxy compound, $M_E$ represents the molecular weight of the epoxy compound, $W_E$ represents the content of the epoxy compound based on the total amount of the refrigerating machine oil, $N_P$ represents the number of phosphorus atoms per one molecule of the phosphorus compound, $M_P$ represents the molecular weight of the phosphorus compound, and $W_P$ represents the content of the phosphorus compound based on the total amount of the refrigerating machine oil.

According to the working fluid composition for a refrigerating machine, both the antiwear property and the stability can be achieved at a high level. In addition, the present inventors infer the reason that such effects are exhibited as follows.

First of all, even though the refrigerating machine oil composition disclosed in Patent Literature 1 comprises a phosphorus-based additive such as a triester phosphate known as an extreme pressure agent or an antiwear agent as described above, the antiwear property is liable to be insufficient. It is considered that this is attributable to the fact that an acid scavenger such as a glycidyl ester used together with the additive for the purpose of improving the stability is adsorbed to a sliding portion of a refrigerating machine to inhibit the adsorption of the phosphorus-based additive to the sliding portion.

In contrast, it is considered that, by blending the phosphorus compound and the epoxy compound into the particular ester so as to satisfy the above formula (1), the working fluid composition for a refrigerating machine according to the present invention can sufficiently suppress the phenomenon that the adsorption of the phosphorus compound to the sliding portion is inhibited by the epoxy compound while sufficiently maintaining the stability and therefore both the antiwear property and the stability can be achieved at a high level.

The following aspects (i) and (ii) are included in the ester.
(i) An ester comprising: a first ester being an ester of pentaerythritol and at least one fatty acid selected from fatty acids having 4 to 9 carbon atoms; and a second ester being an ester of dipentaerythritol and at least one fatty acid selected from fatty acids having 4 to 9 carbon atoms.
(ii) An ester comprising an ester obtained by reacting a mixture of polyhydric alcohols, the mixture comprising pentaerythritol and dipentaerythritol, with at least one fatty acid selected from fatty acids having 4 to 9 carbon atoms.

Furthermore, it is preferable that the content of the second ester in the aspect (i) be 10% by mass or more and 40% by mass or less based on the total of the content of the first ester and the content of the second ester.

It is preferable that the refrigerating machine oil further comprise 0.1% by mass or more and 0.4% by mass or less of 2,6-di-tert.-butyl-p-cresol based on the total amount of the refrigerating machine oil.

It is preferable that the fluoropropene refrigerant be at least one selected from 1,3,3,3-tetrafluoropropene (HFO-1234ze) and 2,3,3,3-tetrafluoropropene (HFC-1234yf).

Moreover, the present invention provides a refrigerating machine oil comprising: an ester of a polyhydric alcohol and a fatty acid; an epoxy compound; and a phosphorus compound, the refrigerating machine oil being used together with a fluoropropene refrigerant, wherein the polyhydric alcohol constituting the ester comprises pentaerythritol and dipentaerythritol, the fatty acid constituting the ester comprises at least one selected from fatty acids having 4 to 9 carbon atoms, and the epoxy compound and the phosphorus compound satisfy a condition represented by the following formula (1):

[Formula 2]

$$0.10 \leq \frac{\left(\frac{N_E}{M_E} \cdot W_E\right)}{\left(\frac{N_P}{M_P} \cdot W_P\right)} \leq 1.50 \quad (1)$$

wherein $N_E$ represents the number of epoxy groups per one molecule of the epoxy compound, $M_E$ represents the molecular weight of the epoxy compound, $W_E$ represents the content of the epoxy compound based on the total amount of the refrigerating machine oil, $N_P$ represents the number of phosphorus atoms per one molecule of the phosphorus compound, $M_P$ represents the molecular weight of the phosphorus compound, and $W_P$ represents the content of the phosphorus compound based on the total amount of the refrigerating machine oil.

Advantageous Effects of Invention

According to the present invention, a working fluid composition for a refrigerating machine, and a refrigerating machine oil each making it possible to achieve both the antiwear property and the stability can be provided.

BRIEF DESCRIPTION OF DRAWINGS

FIG. 1 is a schematic diagram illustrating an example of the constitution of a refrigerating machine.

DESCRIPTION OF EMBODIMENTS

Hereinafter, suitable embodiments according to the present invention is described in detail.

A refrigerating machine oil according to the present embodiment comprises: an ester of a polyhydric alcohol and a fatty acid; an epoxy compound; and a phosphorus compound, and is used together with a fluoropropene refrigerant. The polyhydric alcohol constituting the ester comprises pentaerythritol and dipentaerythritol, the fatty acid constituting the ester comprises at least one selected from fatty acids having 4 to 9 carbon atoms, and the epoxy compound and the phosphorus compound satisfy a condition represented by the following formula (1):

[Formula 3]

$$0.10 \leq \frac{\left(\frac{N_E}{M_E} \cdot W_E\right)}{\left(\frac{N_P}{M_P} \cdot W_P\right)} \leq 1.50 \quad (1)$$

wherein $N_E$ represents the number of epoxy groups per one molecule of the epoxy compound, $M_E$ represents the molecular weight of the epoxy compound, $W_E$ represents the content of the epoxy compound based on the total amount of the refrigerating machine oil, $N_P$ represents the number of phosphorus atoms per one molecule of the phosphorus compound, $M_P$ represents the molecular weight of the phosphorus compound, and $W_P$ represents the content of the phosphorus compound based on the total amount of the refrigerating machine oil.

The working fluid composition for a refrigerating machine according to the present embodiment comprises: a refrigerating machine oil comprising an ester of a polyhydric alcohol and a fatty acid, an epoxy compound, and a phosphorus compound; and a fluoropropene refrigerant. The polyhydric alcohol constituting the ester comprises pentaerythritol and dipentaerythritol, the fatty acid constituting the ester comprises at least one selected from fatty acids having 4 to 9 carbon atoms, and the epoxy compound and the phosphorus compound satisfy a condition represented by the following formula (1). Here, an aspect comprising the refrigerating machine oil according to the present embodiment and a fluoropropene refrigerant is included in the working fluid composition for a refrigerating machine according to the present embodiment.

The refrigerating machine oil according to the present embodiment comprises, as a base oil, an ester of a polyhydric alcohol and a fatty acid. The polyhydric alcohol constituting the ester comprises pentaerythritol and dipentaerythritol, and the fatty acid constituting the ester comprises at least one selected from fatty acids having 4 to 9 carbon atoms.

The following aspects (i) and (ii) are included in the ester.
(i) An ester comprising: a first ester being an ester of pentaerythritol and at least one fatty acid selected from fatty acids having 4 to 9 carbon atoms; and a second ester being an ester of dipentaerythritol and at least one fatty acid selected from fatty acids having 4 to 9 carbon atoms.
(ii) An ester comprising an ester obtained by reacting a mixture of polyhydric alcohols, the mixture comprising pentaerythritol and dipentaerythritol, with at least one fatty acid selected from fatty acids having 4 to 9 carbon atoms.

It is preferable that the ester comprise: a first ester being an ester of pentaerythritol and at least one fatty acid selected from fatty acids having 4 to 9 carbon atoms; and a second ester being an ester of dipentaerythritol and at least one fatty acid selected from fatty acids having 4 to 9 carbon atoms. The content of the first ester is preferably 60% by mass or more, more preferably 65% by mass or more, further more preferably 70% by mass or more. The content of the first ester is preferably 90% by mass or less, more preferably 85% by mass or less, further more preferably 80% by mass or less. The content of the second ester is preferably 10% by mass or more, more preferably 15% by mass or more, further more preferably 20% by mass or more. The content of the second ester is preferably 40% by mass or less, more preferably 35% by mass or less, further more preferably 30% by mass or less. Any of the content of the first ester and the content of the second ester is the content based on the total of the content of the first ester and the content of the second ester. When the contents of the first ester and of the second ester fall within the above range, the antiwear property can sufficiently be secured.

It is preferable that the content of the ester be 70% by mass or more, more preferably 80% by mass or more, further more preferably 90% by mass or more based on the total amount of the refrigerating machine oil because various performances such as lubricity, compatibility with refrigerants, thermal/chemical stability, and electrical insulation are more excellent. The content of the ester can be 99% by mass or less based on the total amount of the refrigerating machine oil.

As the polyhydric alcohol, another polyhydric alcohol in addition to pentaerythritol and dipentaerythritol may be used. For example, a polyhydric alcohol having 2 to 6 hydroxy groups can be used as the another polyhydric alcohol. The content of the another polyhydric alcohol can be 50 mol % or less based on the total amount of the polyhydric alcohols constituting the ester.

Specific examples of a divalent alcohol (diol) include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propandediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol.

Specific examples of a trivalent or higher alcohol include: polyhydric alcohols such as trimethylolethane, trimethylolpropane, trimethylolbutane, di-(trimethylolpropane), tri-(trimethylolpropane), tri-(pentaerythritol), glycerin, polyglycerins (dimer to trimer of glycerin), 1,3,5-pentanetriol, sorbitol, sorbitan, sorbitol/glycerin condensates, adonitol, arabitol, xylitol, and mannitol; saccharides such as xylose, arabinose, ribose, rhamnose, glucose, fructose, galactose, mannose, sorbose, and cellobiose; and partially etherified products thereof. Among these, hindered alcohols such as neopentyl glycol, trimethylolethane, trimethylolpropane, trimethylolbutane, di-(trimethylolpropane), and tri-(trimethylolpropane) are preferable.

Specific examples of the fatty acid having 4 to 9 carbon atoms include straight or branched butanoic acid, straight or branched pentanoic acid, straight or branched hexanoic acid, straight or branched heptanoic acid, straight or branched octanoic acid, and straight or branched nonanoic acid. Among these, fatty acids having a branch at an α position and/or a β position are preferable, and, for example, 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, and 3,5,5-trimethylhexanoic acid are preferable. A mixed acid of 2-methylpropanoic acid and 3,5,5-trimethylhexanoic acid and a mixed acid of 2-ethylhexanoic acid and 3,5,5-trimethylhexanoic acid are more preferable, and the mixed acid of 2-ethylhexanoic acid and 3,5,5-trimethylhexanoic acid is further more preferable.

As the fatty acid, another fatty acid in addition to the fatty acid having 4 to 9 carbon atoms can be used. Examples of the another fatty acid include fatty acids having 10 to 24 carbon atoms. The content of the another fatty acid can be 50 mol % or less based on the total amount of the fatty acids constituting the ester.

More specific examples of the another fatty acid include straight or branched decanoic acid, straight or branched undecanoic acid, straight or branched dodecanoic acid, straight or branched tridecanoic acid, straight or branched tetradecanoic acid, straight or branched pentadecanoic acid, straight or branched hexadecanoic acid, straight or branched heptadecanoic acid, straight or branched octadecanoic acid, straight or branched nonadecanoic acid, straight or branched icosanoic acid, straight or branched heneicosanoic acid, straight or branched docosanoic acid, straight or branched tricosanoic acid, and straight or branched tetracosanoic acid.

The ester may be a partial ester in which part of hydroxy groups in the polyhydric alcohol is left as the hydroxy group without being esterified, may be a complete ester in which all of the hydroxy groups are esterified, or may be a mixture of the partial ester and the complete ester. The hydroxy value of the ester is preferably 10 mgKOH/g or less, more preferably 5 mgKOH/g or less, further more preferably 3 mgKOH/g or less.

As the base oil, another base oil in addition to the ester may be used. Examples of the another base oil include: hydrocarbon-based oils such as mineral oils, olefin polymers, naphthalene compounds, and alkylbenzenes; ester-based oils other than the esters; and oxygen atom-containing synthetic oils such as polyglycols, polyvinyl ethers, ketones, polyphenyl ethers, silicones, polysiloxanes, and perfluoroethers. As the oxygen atom-containing synthetic oil, polyglycols, polyvinyl ethers, and ketones among these are preferably used. The content of the another base oil can be 50% by mass or less based on the total amount of the base oils.

The kinematic viscosity of the base oil is not particularly limited, however the kinematic viscosity at 40° C. can preferably be 3 mm$^2$/s or more, more preferably 4 mm$^2$/s or more, further more preferably 5 mm$^2$/s or more. The kinematic viscosity at 40° C. can preferably be 1000 mm$^2$/s or less, more preferably 500 mm$^2$/s or less, further more preferably 400 mm$^2$/s or less. The kinematic viscosity at 100° C. can preferably be 1 mm$^2$/s or more, more preferably 2 mm$^2$/s or more. The kinematic viscosity at 100° C. can preferably be 100 mm$^2$/s or less, more preferably 50 mm$^2$/s or less.

The refrigerating machine oil according to the present embodiment comprises an epoxy compound and a phosphorus compound in addition to the base oil. The epoxy compound and the phosphorus compound satisfy a condition represented by the following formula (1).

[Formula 4]

$$0.10 \leq \frac{\left(\frac{N_E}{M_E} \cdot W_E\right)}{\left(\frac{N_P}{M_P} \cdot W_P\right)} \leq 1.50 \quad (1)$$

In the formula (1), $N_E$ represents the number of epoxy groups per one molecule of the epoxy compound, $M_E$ represents the molecular weight of the epoxy compound, $W_E$ represents the content (unit: % by mass) of the epoxy compound based on the total amount of the refrigerating machine oil, $N_P$ represents the number of phosphorus atoms per one molecule of the phosphorus compound, $M_P$ represents the molecular weight of the phosphorus compound, and $W_P$ represents the content (unit: % by mass) of the phosphorus compound based on the total amount of the refrigerating machine oil.

Hereinafter, description is made denoting the term in the second side of the formula (1) as E/P (namely, as $E=(N_E/M_E) \cdot W_E$ and $P=(N_P/M_P) \cdot W_P$) for the sake of convenience. E/P is 0.10 or more, it is preferable that E/P be 0.11 or more, and it is more preferable that E/P be 0.12 or more. The stability of the refrigerating machine oil can be improved by E/P being 0.10 or more. E/P is 1.50 or less, it is preferable that E/P be 1.49 or less, and it is more preferable that E/P is 1.48 or less. The function of the phosphorus compound as an antiwear agent can sufficiently be exhibited by E/P being 1.50 or less, and therefore the antiwear property of the refrigerating machine oil can be improved.

In the case where the refrigerating machine oil comprises a plurality of epoxy compounds, $E_i=(N_E/M_E) \cdot W_E$ is calculated for each epoxy compound, and the sum of all the calculated $E_i$ is used as E in the formula (1). In the same manner, in the case where the refrigerating machine oil comprises a plurality of phosphorus compounds, $P_i=(N_P/M_P) \cdot W_P$ is calculated for each phosphorus compound, and the sum of all the calculated $P_i$ is used as P in the formula (1).

Examples of the epoxy compound include, but not particularly limited to, glycidyl ether type epoxy compounds, glycidyl ester type epoxy compounds, oxirane compounds, alkyloxirane compounds, alicyclic epoxy compounds, epoxidized fatty acid monoesters, and epoxidized vegetable oils. These epoxy compounds can be used alone or in combination of two or more.

As the glycidyl ether type epoxy compound, for example, an aryl glycidyl ether type epoxy compound or an alkyl glycidyl ether type epoxy compound represented by the following formula (2) can be used:

[Chemical Formula 1]

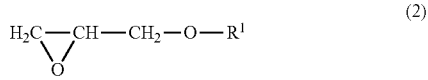

(2)

wherein $R^1$ represents an aryl group or an alkyl group having 5 to 18 carbon atoms.

As the glycidyl ether type epoxy compound represented by the formula (2), n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, and 2-ethylhexyl glycidyl ether are preferable.

When the alkyl group represented by $R^1$ has 5 or more carbon atoms, the stability of the epoxy compound is secured, making it possible to suppress the decomposition before the reaction with water, a fatty acid, or an oxidative degradation product occurs and the self-polymerization in which polymerization occurs between epoxy compounds, and therefore the intended function is easy to obtain. Meanwhile, when the alkyl group represented by $R^1$ has 18 or less carbon atoms, the compatibility with the refrigerant is favorably maintained, and therefore it is possible to make trouble such as cooling failure due to precipitation in a refrigerating apparatus hard to occur.

As the glycidyl ether type epoxy compound, neopentyl glycol diglycidyl ether, trimethylolpropane triglycidyl ether, pentaerythritol tetraglycidyl ether, 1,6-hexanediol diglycidyl ether, sorbitol polyglycidyl ethers, polyalkylene glycol monoglycidyl ethers, polyalkylene glycol diglycidyl ethers, and so on other than the epoxy compound represented by the formula (2) can also be used.

As the glycidyl ester type epoxy compound, for example, a compound represented by the following formula (3) can be used:

[Chemical Formula 2]

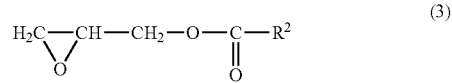

(3)

wherein, $R^2$ represents an aryl group, or an alkyl group or an alkenyl group having 5 to 18 carbon atoms.

As the glycidyl ester type epoxy compound represented by the formula (3), glycidyl benzoate, glycidyl neodecanoate, glycidyl-2,2-dimethyloctanoate, glycidyl acrylate, and glycidyl methacrylate are preferable.

When the alkyl group represented by $R^2$ has 5 or more carbon atoms, the stability of the epoxy compound is secured, making it possible to suppress the decomposition before the reaction with water, a fatty acid, or an oxidative degradation product occurs and the self-polymerization in which polymerization occurs between epoxy compounds, and therefore the intended function is easy to obtain. Meanwhile, when the alkyl group or the alkenyl group represented by $R^2$ has 18 or less carbon atoms, the compatibility with the refrigerant is favorably maintained, and therefore it is possible to make trouble such as cooling failure due to precipitation in a refrigerating machine hard to occur.

The alicyclic epoxy compound is a compound represented by the following formula (4), the compound having a partial structure in which carbon atoms that constitute an epoxy group directly constitute an alicyclic ring.

[Chemical Formula 3]

(4)

As the alicyclic epoxy compound, for example, 1,2-epoxycyclohexane, 1,2-epoxycyclopentane, 3',4'-epoxycyclohexylmethyl-3,4-epoxycyclohexane carboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hepto-3-yl)-spiro(1,3-dioxane-5,3'-[7]oxabicyclo[4.1.0]heptane), 4-(1'-methylepoxyethyl)-1,2-epoxy-2-methylcyclohexane, and 4-epoxyethyl-1,2-epoxycyclohexane are preferable.

Examples of the allyl oxirane compound include 1,2-epoxystyrene, and alkyl-1,2-epoxystyrenes.

Examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane and 1,2-epoxyicosane.

Examples of the epoxidized fatty acid monoester include esters of an epoxidized fatty acid having 12 to 20 carbon atoms and an alcohol, phenol, or alkylphenol having 1 to 8 carbon atoms. As the epoxidized fatty acid monoester, butyl, hexyl, benzyl, cyclohexyl, methoxyethyl, octyl, phenyl, and butylphenyl esters of epoxystearic acid are preferably used.

Examples of the epoxidized vegetable oils include epoxy compounds of vegetable oils such as soybean oil, linseed oil, and cotton seed oil.

The content of the epoxy compound may appropriately be set so as to satisfy the condition represented by the above formula (1), but can preferably be 0.1% by mass or more, more preferably 0.15% by mass or more, further more preferably 0.2% by mass or more based on the total amount of the refrigerating machine oil. The content of the epoxy compound can preferably be 1.0% by mass or less, more preferably 0.8% by mass or less, further more preferably 0.5% by mass or less based on the total amount of the refrigerating machine oil.

Examples of the phosphorus compound (also referred to as "phosphorus-based additive" or "phosphorus-based antiwear agent") include, but not limited to, phosphoric acid esters, acidic phosphoric acid esters, thiophosphoric acid esters, amine salts of acidic phosphoric acid esters, chlorinated phosphoric acid esters, phosphorous acid esters. These phosphorus compounds can be used alone or in combination of two or more.

Examples of the phosphoric acid ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and xylenyl diphenyl phosphate.

Examples of the acidic phosphoric acid ester include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

Examples of the thiophosphoric acid ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate, and xylenyl diphenyl phosphorothionate.

Examples of the amine salt of the acidic phosphoric acid ester include salts of the above acidic phosphoric acid esters with amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine, and trioctylamine.

Examples of the chlorinated phosphoric acid ester include tris-dichloropropyl phosphate, tris-chloroethyl phosphate, tris-chlorophenyl phosphate, and polyalkylene-bis[di(chloroalkyl)]phosphates. Examples of the phosphorous acid ester include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite.

The content of the phosphorus compound may appropriately be set so as to satisfy the condition represented by the above formula (1), but can preferably be 0.1% by mass or more, more preferably 0.2% by mass or more, further more preferably 0.3% by mass or more based on the total amount of the refrigerating machine oil. The content of the phosphorus compound can preferably be 2.4% by mass or less, preferably 2.0% by mass or less, further more preferably 1.0% by mass or less based on the total amount of the refrigerating machine oil.

It is preferable that the refrigerating machine oil according to the present embodiment further contain 2,6-di-tert.-butyl-p-cresol. The content of 2,6-di-tert.-butyl-p-cresol is preferably 0.1% by mass or more, more preferably 0.15% by mass or more, further more preferably 0.2% by mass or more based on the total amount of the refrigerating machine oil. The content of 2,6-di-tert.-butyl-p-cresol is preferably 0.4% by mass or less, more preferably 0.35% by mass or less, further more preferably 0.3% by mass or less based on the total amount of the refrigerating machine oil. When the content is equal to or higher than the lower limit value of the above values, the stability of the refrigerating machine oil can be improved more. Meanwhile, when the content is equal to or lower than the upper limit value of the above values, coloration of the refrigerating machine oil due to 2,6-di-tert.-butyl-p-cresol can be suppressed.

Moreover, the refrigerating machine oil according to the present embodiment can contain a conventionally known additive for refrigerating machine oils as necessary for the purpose of further enhancing its performance. Examples of the additive include phenol-based antioxidants such as bisphenol A, amine-based antioxidants such as phenyl-α-naphthylamine and N,N-di(2-naphthyl)-p-phenylenediamine, extreme pressure agents such as chlorinated paraffins and sulfur compounds, oiliness agents such as fatty acids, antifoaming agents such as silicone-based antifoaming agents, metal deactivators such as benzotriazole, antiwear agents, viscosity index improvers, pour point depressants, and detergent dispersants. These additives may be used alone or in combination of two or more. The content of these additives is not particularly limited, but is preferably 10% by mass or less, more preferably 5% by mass or less based on the total amount of the refrigerating machine oil.

The volume resistivity of the refrigerating machine oil is not particularly limited, but can preferably be $1.0 \times 10^{12}$ Ω·cm or more, more preferably $1.0 \times 10^{13}$ Ω·cm or more, further more preferably $1.0 \times 10^{14}$ Ω·cm or more. Especially in the case where the refrigerating machine oil is used for hermetic type refrigerating machines, there is a tendency that high electrical insulation properties are required. In addition, the volume resistivity in the present invention means a value at 25° C. measured in accordance with HS C2101 "Testing methods of electrical insulating oils".

The moisture content of the refrigerating machine oil is not particularly limited, but can preferably be 200 ppm or less, more preferably 100 ppm or less, further more preferably 50 ppm or less based on the total amount of the refrigerating machine oil. Especially in the case where the refrigerating machine oil is used for hermetic type refrigerating machines, it is required that the moisture content be small from the standpoint of thermal/chemical stability or influence on electrical insulation of the refrigerating machine oil.

The acid value of the refrigerating machine oil is not particularly limited, but can preferably be 0.1 mgKOH/g or less, more preferably 0.05 mgKOH/g or less. Moreover, the hydroxy group value of the refrigerating machine oil is not particularly limited, but can preferably be 5.0 mgKOH/g or less, more preferably 2.0 mgKOH/g or less. When the acid value and the hydroxy value satisfy the above conditions, corrosion of metals used in the refrigerating machine or pipes can be prevented more. In addition, the acid value in the present invention means an acid value measured in accordance with HS K2501 "Petroleum products and lubricants-Determination of neutralization number", and the hydroxy group value in the present invention means a hydroxy group value measured in accordance with JIS K0070 "Test methods for acid value, saponification value, ester value, iodine value, hydroxyl value and unsaponifiable matter of chemical products".

The ash content of the refrigerating machine oil is not particularly limited, but can preferably be 100 ppm or less, more preferably 50 ppm or less for the purpose of enhancing the thermal/chemical stability of the refrigerating machine oil to suppress the occurrence of sludge or the like. In addition, the ash content in the present invention means a value of the ash content measured in accordance with JIS K2272 "Crude oil and petroleum products-Determination of ash and sulfated ash".

The pour point of the refrigerating machine oil can preferably be −10° C. or lower, more preferably −20° C. or lower. The pour point in the present invention means a pour point measured in accordance with HS K2269.

The refrigerating machine oil according to the present embodiment is used together with a fluoropropene refrigerant. Moreover, the working fluid composition for a refrigerating machine according to the present embodiment comprises a fluoropropene refrigerant.

The composition comprising: an ester of a polyhydric alcohol and a fatty acid; an epoxy compound; and a phosphorus compound, wherein the polyhydric alcohol constituting the ester comprises pentaerythritol and dipentaerythritol, the fatty acid constituting the ester comprises at least one selected from fatty acids having 4 to 9 carbon atoms, and the epoxy compound and the phosphorus compound satisfy the condition represented by the above formula (1) is suitably used as a constituent of the refrigerating machine oil to be used together with the fluoropropene refrigerant or a constituent of the working fluid composition for a refrigerating machine comprising the refrigerating machine oil and the fluoropropene refrigerant.

The composition comprising: an ester of a polyhydric alcohol and a fatty acid; an epoxy compound; and a phosphorus compound, wherein the polyhydric alcohol constituting the ester comprises pentaerythritol and dipentaerythritol, the fatty acid constituting the ester comprises at least one selected from fatty acids having 4 to 9 carbon atoms, and the epoxy compound and the phosphorus compound satisfy the condition represented by the above formula (1) is suitably used for production of a refrigerating machine oil to be used together with the fluoropropene refrigerant or a working fluid composition for a refrigerating machine comprising the refrigerating machine oil and the fluoropropene refrigerant.

It is preferable that the fluoropropene refrigerant be a fluoropropene having of 3 to 5 fluorine atoms, and it is preferable that the fluoropropene refrigerant be any one of or a mixture of two or more of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). It is preferable that the fluoropropene refrigerant is at least one selected from HFO-1234ze and HFO-1234yf from the standpoint of refrigerant physical properties.

As the refrigerant to be used together with the refrigerating machine oil according to the present embodiment and as the refrigerant that the working fluid composition for a refrigerating machine according to the present embodiment comprises, another refrigerant may be used in addition to the fluoropropene refrigerant. Examples of the another refrigerant include fluorine-containing ether-based refrigerants such as saturated hydrofluorocarbon refrigerants and perfluoroethers, a bis(trifluoromethyl)sulfide refrigerant, a trifluoroiodomethane refrigerant, and natural refrigerants such as dimethyl ether, carbon dioxide, ammonia, and hydrocarbons.

The blending ratio of the refrigerating machine oil to the refrigerant in the working fluid composition for a refrigerating machine is not particularly limited, however the refrigerating machine oil can preferably be 1 to 500 parts by mass, more preferably 2 to 400 parts by mass relative to 100 parts by mass of the refrigerant.

The refrigerating machine oil and working fluid composition for a refrigerating machine according to the present embodiment are preferably used for air conditioners or refrigerating machines equipped with a reciprocating or rotating hermetic type compressor, or open type or hermetic type automotive air conditioners. Moreover, the refrigerating machine oil and working fluid composition for a refrigerating machine according to the present embodiment are preferably used for refrigerating apparatuses etc. for dehumidifiers, hot-water supply systems, freezers, refrigeration and cold storage warehouse, vending machines, showcases, chemical plants, and so on. Further, the refrigerating machine oil and working fluid composition for a refrigerating machine according to the present embodiment are also preferably used for machines equipped with a centrifugal compressor.

Hereinafter, the above-mentioned refrigerating machine is described in more detail. FIG. 1 is a schematic diagram illustrating an example of the constitution of a refrigerating machine. As illustrated in FIG. 1, the refrigerating machine 10 is provided with a refrigerant-circulating system in which at least a compressor 1, a condenser 2, an expansion mechanism 4, and an evaporator 5 are sequentially connected by a flow channel 6. The refrigerant-circulating system may further be provided with a drier 3.

In the compressor 1, a small amount of refrigerant and a large amount of refrigerating machine oil coexist under a high temperature (usually 70 to 120° C.) condition. The refrigerant ejected from the compressor 1 to the flow channel 6 is in a gaseous form and contains a small amount (usually 1 to 10%) of refrigerating machine oil as mist, and a small amount of refrigerant is dissolved in the refrigerating machine oil in a mist form (point a in FIG. 1). Next, in the condenser 2, the refrigerant in a gaseous form is compressed to become a high-density fluid, and a large amount of refrigerant and a small amount of refrigerating machine oil coexist under a relatively high temperature (usually around 50 to around 70° C.) condition (point b in FIG. 1). Further, the mixture of a large amount of refrigerant and a small amount of refrigerating machine oil is sequentially fed into the dryer 3, the expansion mechanism 4, and the evaporator 5 to be cooled rapidly to a low temperature (usually −40 to 0° C.) (points c and d in FIG. 1), and is returned to the compressor 1.

As the compressor 1, both open type compressors equipped with a prim motor outside and hermetic type compressors equipped with a motor built therein can be used.

Examples of the open type compressor include reciprocating compressors such as piston-crank type, piston-swash-plate type compressors and rotary type compressors such as rotary piston type, rotary vane type, scroll type, and screw type compressors. Examples of the outside prime motor include engines and motors, however especially in the case of automotive air conditioners, use of an engine for traveling as the outside prime motor is common.

Examples of the hermetic type compressor include: a high-pressure container type compressor that houses, in a hermetic container that stores a refrigerating machine oil, a motor consisting of a rotor and a stator, a rotary shaft fitted to the rotor, and a compressor section connected to the motor through the rotary shaft, wherein a high-pressure refrigerant gas ejected from the compressor section is retained in the hermetic container; and a low-pressure container type compressor that houses, in a hermetic container that stores a refrigerating machine oil composition, a motor consisting of a rotor and a stator, a rotary shaft fitted to the rotor, and a compressor section connected to the motor through the rotary shaft, wherein a high-pressure refrigerant gas ejected from the compressor section is directly discharged outside the hermetic container.

In the dryer 3, a desiccating agent such as synthetic zeolite consisting of, for example, an alkali metal complex salt of silicic acid and aluminic acid is filled.

EXAMPLES

Hereinafter, the present invention is described further specifically based on Examples and Comparative Examples, however the present invention is not limited to the following Examples at all.

Examples 1 to 6, and Comparative Examples 1 to 11

In Examples 1 to 6 and Comparative Examples 1 to 11, refrigerating machine oils were prepared according to the amounts for blending shown in Tables 2 to 4 using base oils 1, A1, and B1 shown in Table 1 and additives shown below. Antiwear property tests and stability tests shown below were conducted for the prepared refrigerating machine oils of Examples 1 to 6 and Comparative Examples 1 to 11.

TABLE 1

| Base oil number | | 1 | A1 | A2 | B1 |
|---|---|---|---|---|---|
| Polyhydric alcohol | | Neopentyl glycol | Pentaerythritol | Pentaerythritol | Dipentaerythritol |
| Fatty acid A | Species | 2-Ethyl-hexanoic acid | 2-Methyl-propanoic acid | 2-Ethyl-hexanoic acid | 2-Ethyl-hexanoic acid |
| | Blending ratio of fatty acid (mol %) | 100 | 35 | 50 | 50 |
| Fatty acid B | Species | — | 3,5,5-Trimethyl-hexanoic acid | 3,5,5-Trimethyl-hexanoic acid | 3,5,5-Trimethyl-hexanoic acid |
| | Blending ratio of fatty acid (mol %) | — | 65 | 50 | 50 |
| Kinematic viscosity | 40° C. (mm$^2$/s) | 7.5 | 69.4 | 68.4 | 222.5 |
| | 100° C. (mm$^2$/s) | 2.0 | 8.2 | 8.4 | 18.8 |

<Additives>
C1: glycidyl neodecanoate
C2: 2-ethylhexyl glycidyl ether
C3: 1,2-epoxy tetradecane
D1: tricresyl phosphate
D2: triphenyl phosphorothionate
E1: 2,6-di-tert.-butyl-p-cresol (Antiwear Property Test)

A high-pressure atmosphere friction tester (employing rotating/sliding method using a rotating vane member and a fixed disk member) which was manufactured by Shinko Engineering Co., Ltd. and which made it possible to make a refrigerant atmosphere similar to that made with an actual compressor was used for antiwear property tests. Test conditions were as follows; amount of oil: 600 ml, test temperature: 100° C., number of revolutions: 400 rpm, applied load: 70 kgf, test time: 1 hour, SKH-51 was used as the vane member, and FC250 was used as the disc member. Moreover, as the test conditions, 2,3,3,3-tetrafluoropropene (HFO-1234yf) was used as a refrigerant, and the pressure in the test vessel was set to 1.1 MPa. The evaluation of the antiwear property was conducted in terms of the depth of wear in the vane member because the amount of wear in the disk member was extremely small. The obtained results are shown in Tables 2 to 4.

(Stability Test)

The stability tests were conducted in accordance with JIS K2211-09 (autoclave test), 80 g of each sample oil whose amount of contained moisture was adjusted to 100 ppm was weighed and put into an autoclave, a catalyst (iron, copper, and aluminum wires each having an outer diameter of 1.6 mm×a length of 50 mm) and 20 g of a 2,3,3,3-tetrafluoropropene (HFO-1234yf) refrigerant were sealed in the autoclave, and then the resultant mixture was heated to 150° C. to observe and measure the appearance and the acid value (JIS C2101) of the sample oil after 150 hours. The obtained results are shown in Tables 2 to 4.

TABLE 2

| | | Example 1 | Example 2 | Example 3 | Example 4 | Example 5 | Example 6 |
|---|---|---|---|---|---|---|---|
| Composition of base oil (% by mass, based on total amount of base oil) | 1 | — | — | — | — | — | — |
| | A1 | 70 | — | — | — | — | — |
| | A2 | — | 90 | 90 | 70 | 70 | 60 |
| | B1 | 30 | 10 | 10 | 30 | 30 | 40 |
| Composition of refrigerating machine oil (% by mass, based on total amount of refrigerating machine oil) | Base oil | 97.48 | 98.1 | 96.9 | 98.1 | 98.1 | 97.62 |
| | C1 | — | 0.5 | 1.0 | 0.5 | — | 0.98 |
| | C2 | 0.12 | — | — | — | — | — |
| | C3 | — | — | — | — | 0.5 | — |
| | D1 | — | 1.0 | 2.0 | 1.0 | 1.0 | 1.0 |
| | D2 | 2.0 | — | — | — | — | — |
| | E1 | 0.4 | 0.4 | 0.1 | 0.4 | 0.4 | 0.4 |
| | E/P | 0.11 | 0.76 | 0.76 | 0.76 | 0.82 | 1.49 |
| Antiwear property test | Depth of wear (μm) | 4.1 | 4.8 | 4.9 | 3.2 | 4.3 | 3.7 |
| Stability test | Appearance | No precipitation | No precipitation | No precipitation | No precipitation | No precipitation | No precipitation |
| | Acid value (mgKOH/g) | 0.11 | 0.01 | 0.05 | 0.01 | 0.09 | 0.01 |

TABLE 3

| | | Comp. Example 1 | Comp. Example 2 | Comp. Example 3 | Comp. Example 4 | Comp. Example 5 | Comp. Example 6 |
|---|---|---|---|---|---|---|---|
| Composition of base oil (% by mass, based on total amount of base oil) | 1 | 60 | 80 | — | — | — | — |
| | A1 | — | — | 70 | 70 | 70 | 100 |
| | A2 | — | — | — | — | — | — |
| | B1 | 40 | 20 | 30 | 30 | 30 | — |
| Composition of refrigerating machine oil (% by mass, based on total amount of refrigerating machine oil) | Base oil | 98.47 | 98.1 | 95.6 | 95.1 | 97.1 | 97.6 |
| | C1 | 0.03 | — | — | — | — | — |
| | C2 | — | — | 2.0 | 2.5 | 1.5 | 1.0 |
| | C3 | — | 0.5 | — | — | — | — |
| | D1 | 1.0 | 1.0 | — | — | — | — |
| | D2 | — | — | 2.0 | 2.0 | 1.0 | 1.0 |
| | E1 | 0.5 | 0.4 | 0.4 | 0.4 | 0.4 | 0.4 |
| | E/P | 0.05 | 0.82 | 1.84 | 2.30 | 2.76 | 1.84 |
| Antiwear property test | Depth of wear (μm) | 5.5 | 6.3 | 5.9 | 5.7 | 6.1 | 6.3 |
| Stability test | Appearance | No precipitation | No precipitation | No precipitation | No precipitation | No precipitation | No precipitation |
| | Acid value (mgKOH/g) | 0.51 | 0.01 | 0.01 | 0.01 | 0.01 | 0.01 |

TABLE 4

|  |  | Comp. Example 7 | Comp. Example 8 | Comp. Example 9 | Comp. Example 10 | Comp. Example 11 |
|---|---|---|---|---|---|---|
| Composition of base oil (% by mass, based on total amount of base oil) | 1 | — | — | — | — | — |
|  | A1 | — | — | — | — | — |
|  | A2 | 100 | 100 | 70 | 90 | 90 |
|  | B1 | — | — | 30 | 10 | 10 |
| Composition of refrigerating machine oil (% by mass, based on total amount of refrigerating machine oil) | Base oil | 97.5 | 97.0 | 97.6 | 97.5 | 98.45 |
|  | C1 | 1.0 | 1.5 | 1.0 | 1.0 | 0.05 |
|  | C2 | — | — | — | — | — |
|  | C3 | — | — | — | — | — |
|  | D1 | 1.0 | 1.0 | 1.0 | 1.0 | 1.0 |
|  | D2 | — | — | — | — | — |
|  | E1 | 0.5 | 0.5 | 0.4 | 0.5 | 0.5 |
|  | E/P | 1.52 | 2.28 | 1.52 | 1.52 | 0.08 |
| Antiwear property test | Depth of wear (μm) | 6.8 | 7.5 | 5.8 | 6.3 | 4.7 |
| Stability test | Appearance | No precipitation | No precipitation | No precipitation | No precipitation | No precipitation |
|  | Acid value (mgKOH/g) | 0.01 | 0.01 | 0.01 | 0.01 | 0.38 |

REFERENCE SIGNS LIST

1 . . . Compressor, 2 . . . Condenser, 3 . . . Dryer, 4 . . . Expansion mechanism, 5 . . . Evaporator, 6 . . . Flow channel, 10 . . . Refrigerating machine.

The invention claimed is:

1. A working fluid composition for a refrigerating machine, comprising:
   a refrigerating machine oil comprising an ester of a polyhydric alcohol and a fatty acid, an epoxy compound, and a phosphorus compound; and
   a fluoropropene refrigerant,
   wherein the polyhydric alcohol constituting the ester comprises pentaerythritol and dipentaerythritol,
   the fatty acid constituting the ester comprises at least one selected from fatty acids having 4 to 9 carbon atoms, and
   the epoxy compound and the phosphorus compound satisfy a condition represented by the following formula (1):

[Formula 1]

$$0.10 \leq \frac{\left(\frac{N_E}{M_E} \cdot W_E\right)}{\left(\frac{N_P}{M_P} \cdot W_P\right)} \leq 1.50 \quad (1)$$

wherein $N_E$ represents a number of epoxy groups per one molecule of the epoxy compound, $M_E$ represents a molecular weight of the epoxy compound, $W_E$ represents a content of the epoxy compound based on a total amount of the refrigerating machine oil, $N_P$ represents a number of phosphorus atoms per one molecule of the phosphorus compound, $M_P$ represents a molecular weight of the phosphorus compound, and $W_P$ represents a content of the phosphorus compound based on the total amount of the refrigerating machine oil.

2. The working fluid composition for a refrigerating machine according to claim 1, wherein the ester comprises a mixture of a first ester being an ester of pentaerythritol and at least one fatty acid selected from fatty acids having 4 to 9 carbon atoms and a second ester being an ester of dipentaerythritol and at least one fatty acid selected from fatty acids having 4 to 9 carbon atoms.

3. The working fluid composition for a refrigerating machine according to claim 2, wherein a content of the second ester is 10% by mass or more and 40% by mass or less based on a, total of a content of the first ester and the content of the second ester.

4. The working fluid composition for a refrigerating machine according to claim 1, further comprising 0.1% by mass or more and 0.4% by mass or less of 2,6-di-tert.-butyl-p-cresol based on the total amount of the refrigerating machine oil.

5. The working fluid composition for a refrigerating machine according to claim 1, wherein the fluoropropene refrigerant is at least one selected from 1,3,3,3-tetrafluoropropene (HFO-1234ze) and 2,3,3,3-tetrafluoropropene (HFO-1234yf).

6. A refrigerating machine oil comprising:
   an ester of a polyhydric alcohol and a fatty acid;
   an epoxy compound; and
   a phosphorus compound,
   the refrigerating machine oil being used with a fluoropropene refrigerant,
   wherein the polyhydric alcohol constituting the ester comprises pentaerythritol and dipentaerythritol,
   the fatty acid constituting the ester comprises at least one selected from fatty acids having 4 to 9 carbon atoms, and
   the epoxy compound and the phosphorus compound satisfy a condition represented by the following formula (1):

[Formula 2]

$$0.10 \leq \frac{\left(\frac{N_E}{M_E} \cdot W_E\right)}{\left(\frac{N_P}{M_P} \cdot W_P\right)} \leq 1.50 \quad (1)$$

wherein $N_E$ represents a number of epoxy groups per one molecule of the epoxy compound, $M_E$ represents a molecular weight of the epoxy compound, $W_E$ represents a content of the epoxy compound based on a total amount of the refrigerating machine oil, $N_P$ represents a number of phosphorus atoms per one molecule of the phosphorus compound, $M_P$ represents a molecular weight of the phosphorus compound, and $W_P$ represents a content of the phosphorus compound based on the total amount of the refrigerating machine oil.

7. The working fluid composition for a refrigerating machine according to claim 3, wherein the fatty acid comprises a mixed acid of 2-methylpropanoic acid and 3,5,5-trimethylhexanoic acid or a mixed acid of 2-ethylhexanoic acid and 3,5,5-trimethylhexanoic acid.

8. The working fluid composition for a refrigerating machine according to claim 1, wherein
a content of the ester is 80% by mass or more and 99% by mass or less based on a total amount of the refrigerating machine oil,
the epoxy compound is at least one selected from the group consisting of
a compound represented by the following formula (2)

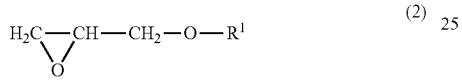

wherein $R^1$ represents an aryl group or an alkyl group having 5 to 18 carbon atoms,
a compound represented by the following formula (3)

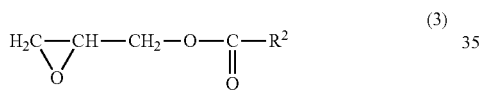

wherein $R^2$ represents an aryl group, or an alkyl group or an alkenyl group having 5 to 18 carbon atoms, and
a compound represented by the following formula (4),

a content of the epoxy compound is 0.1% by mass or more and 1.0% by mass or less based on a total amount of the refrigerating machine oil,
the phosphorus compound is at least one selected from the group consisting of
a phosphoric acid ester selected from the group consisting of tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and xylenyl diphenyl phosphate, and
a thiophosphoric acid ester selected from the group consisting of tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate, and xylenyl diphenyl phosphorothionate, and
a content of the phosphorus compound is 0.1% by mass or more and 2.4% by mass or less based on a total amount of the refrigerating machine oil.

9. The working fluid composition for a refrigerating machine according to claim 3, wherein
a content of the ester is 80% by mass or more and 99% by mass or less based on a total amount of the refrigerating machine oil,
the epoxy compound is at least one selected from the group consisting of
a compound represented by the following formula (2)

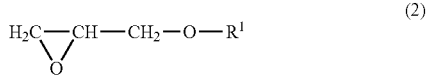

wherein $R^1$ represents an aryl group or an alkyl group having 5 to 18 carbon atoms,
a compound represented by the following formula (3)

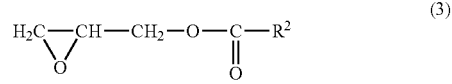

wherein $R^2$ represents an aryl group, or an alkyl group or an alkenyl group having 5 to 18 carbon atoms, and
a compound represented by the following formula (4),

a content of the epoxy compound is 0.1% by mass or more and 1.0% by mass or less based on a total amount of the refrigerating machine oil,
the phosphorus compound is at least one selected from the group consisting of
a phosphoric acid ester selected from the group consisting of tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and xylenyl diphenyl phosphate, and a thiophosphoric acid ester selected from the group consisting of tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate, and xylenyl diphenyl phosphorothionate, and a content of the phosphorus compound is 0.1% by mass or more and 2.4% by mass or less based on a total amount of the refrigerating machine oil.

10. The working fluid composition for a refrigerating machine according to claim 4, wherein a content of the ester is 80% by mass or more and 99% by mass or less based on a total amount of the refrigerating machine oil, the epoxy compound is at least one selected from the group consisting of a compound represented by the following formula (2)

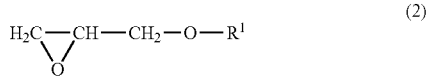
(2)

wherein $R^1$ represents an aryl group or an alkyl group having 5 to 18 carbon atoms, a compound represented by the following formula (3)

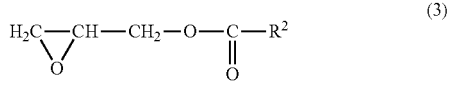
(3)

wherein $R^2$ represents an aryl group, or an alkyl group or an alkenyl group having 5 to 18 carbon atoms, and a compound represented by the following formula (4),

(4)

a content of the epoxy compound is 0.1% by mass or more and 1.0% by mass or less based on a total amount of the refrigerating machine oil, the phosphorus compound is at least one selected from the group consisting of a phosphoric acid ester selected from the group consisting of tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and xylenyl diphenyl phosphate, and a thiophosphoric acid ester selected from the group consisting of tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate, and xylenyl diphenyl phosphorothionate, and a content of the phosphorus compound is 0.1% by mass or more and 2.4% by mass or less based on a total amount of the refrigerating machine oil.

11. The working fluid composition for a refrigerating machine according to claim 4, wherein the lower limit is 0.12 or more and the upper limit is 1.48 or less in the formula (1).

12. The working fluid composition for a refrigerating machine according to claim 10, wherein the lower limit is 0.12 or more and the upper limit is 1.48 or less in the formula (1).

* * * * *